United States Patent [19]

Yu

[11] Patent Number: 5,609,050
[45] Date of Patent: Mar. 11, 1997

[54] AUTOMOBILE STEERING WHEEL LOCKING DEVICE

[76] Inventor: Chien H. Yu, P.O. Box 1032, Tainan, Taiwan

[21] Appl. No.: 616,338

[22] Filed: Mar. 15, 1996

[51] Int. Cl.⁶ .................................................. B60R 25/02
[52] U.S. Cl. ........................... 70/209; 70/226; 70/DIG. 49
[58] Field of Search ............................. 70/18, DIG. 49, 70/209, 211, 212, 225, 226, 237, 238, 239; 340/426

[56] References Cited

U.S. PATENT DOCUMENTS

| | | | |
|---|---|---|---|
| 1,429,334 | 9/1922 | Furber | 70/211 |
| 5,055,823 | 10/1991 | Fuller | 70/212 X |
| 5,097,685 | 3/1992 | Lien | 70/211 X |
| 5,353,615 | 10/1994 | Chen | 70/226 X |
| 5,400,627 | 3/1995 | Liao | 70/209 |
| 5,426,960 | 6/1995 | Jan | 70/209 |
| 5,428,976 | 7/1995 | Weng et al. | 70/209 |
| 5,435,158 | 7/1995 | Ta-Yung | 70/209 |

Primary Examiner—Lloyd A. Gall

[57] ABSTRACT

An automobile steering wheel locking device includes a bar element and a locking portion disposed to one end of the bar element, the locking portion including a base in which an alarm device is disposed, a tube rotatably and transversely disposed through the base wherein a hole and an actuating portion are respectively defined in the tube, a covered-up portion extending radially from each one of two ends of the tube wherein each one of the two ends extends from the base so as to receive a section of the steering wheel within a space defined by the base, the covered-up portions and a plate extending from the bar element, a lock disposed to the bar element and having a pin controllably inserted into the hole and an actuating rod extending from the alarm device connected to the actuating portion of the tube such that when the pin is moved from the hole of the tube by operating the lock, the tube is then rotated by the fact that the covered-up portions drop downwardly by the gravity and the actuating rod of the alarm device is actuated.

3 Claims, 5 Drawing Sheets

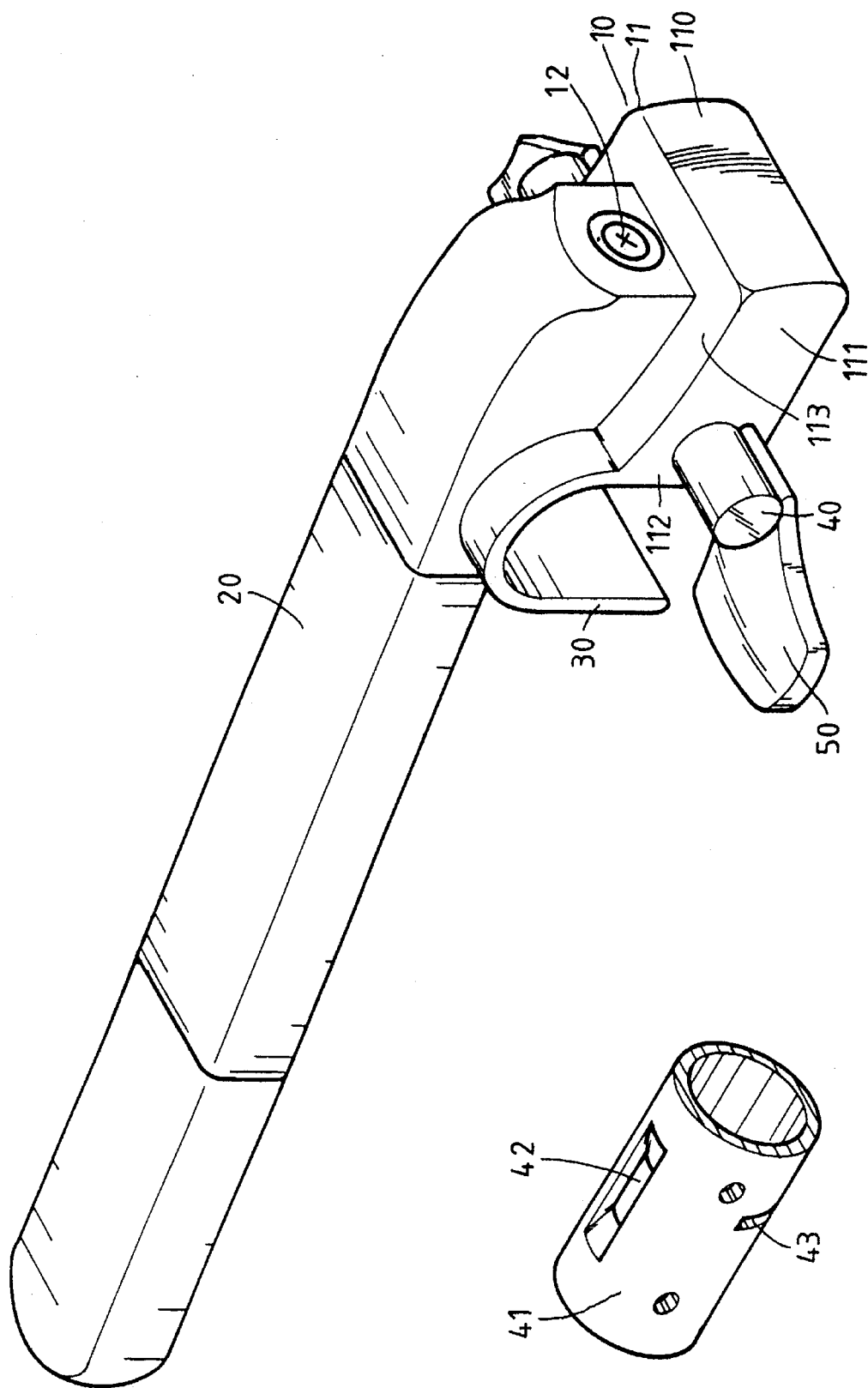

ably disposed through the two side surfaces 111 of the base and has an end section 40 extending from each one of the two side surfaces 111 respectively, each of the two end sections 40 having a covered-up portion 50 extending radially therefrom. The tube 41 has a hole 42 and an actuating portion which is a slot 43 in FIG. 2 for example, both are respectively defined in an outer peripheral surface thereof and located within the base 11.

AUTOMOBILE STEERING WHEEL LOCKING DEVICE

BACKGROUND OF THE INVENTION

1. Field of the Invention

The present invention relates to an automobile steering wheel locking device and more particularly, to an automobile steering wheel locking device with an electric alarm means disposed therein which is caused by operating a lock disposed in the locking device.

2. Brief Description of the Prior Art

There is a kind of automobile steering wheel locking device which is composed of a long bar and a locking portion which is connected to a first end of the long bar, the locking portion having a receiving portion defined in an under side thereof and a pivotal element pivotally disposed to the locking portion so as to receive a section of the steering wheel therein by rotating the pivotal element to securely enclose the section of the steering wheel between the receiving portion and the pivotal element.

Accordingly, the steering locking device is fixedly attached to the steering wheel and the long bar of the steering wheel locking device has a certain length such that the long bar will contact the driver or the front shield of the car so as to limit the degree that the steering wheel can be turned such that the car cannot be driven before the steering wheel locking device is unlocked. Additionally, many drivers dispose an electric alarm means to their cars so as to produce an alarm signal when some one invades into the car equipped with the alarm means without a permission from the owner. The alarm means is operated by electricity, therefore, the driver must connect an electric wire to a battery of the car to set the alarm means into an effective mode and remote the alarm means by a remoter. However, it is deemed to be inconvenient for a driver because to unlock the steering wheel locking device and to cancel the mode of the alarm means have to be operated separately.

Therefore, there has been a long and unfulfilled need for an automobile steering wheel locking device equipped with an alarm means and both of them are operated by the locking device.

SUMMARY OF THE INVENTION

The present invention provides an automobile steering wheel locking device which includes a bar element and a locking portion disposed to one end of the bar element, the locking portion has a base in which an alarm means is disposed. A tube is rotatably and transversely disposed through the base wherein a hole and an actuating portion are respectively defined in the tube, a covered-up portion extending radially from each one of two ends of the tube which the two ends respectively extend from the base so as to receive a section of the steering wheel within a space defined by the base, the covered-up portions and a plate extending from the bar element. A lock is disposed to the bar element and has a pin controllably inserted into the hole and an actuating rod extends from the alarm means and connects to the actuating portion of the tube such that when the pin is moved from the hole of the tube by operating the lock, the tube is then rotated because the covered-up portions drop downwardly by the gravity and the actuating rod of the alarm means is actuated.

It is an object of the present invention to provide an automobile steering wheel locking device having an alarm means disposed therein.

It is another object of the present invention to provide an alarm means disposed in the locking device and is operated by the locking device.

Other objects, advantages, and novel features of the invention will become more apparent from the following detailed description when taken in conjunction with the accompanying drawings.

BRIEF DESCRIPTION OF THE DRAWINGS

FIG. 1 is a perspective view of an automobile steering wheel locking device in accordance with the present invention;

FIG. 2 is a perspective view of a section of the tube in accordance with the present invention.

DETAILED DESCRIPTION OF THE PREFERRED EMBODIMENTS

Figure 3:
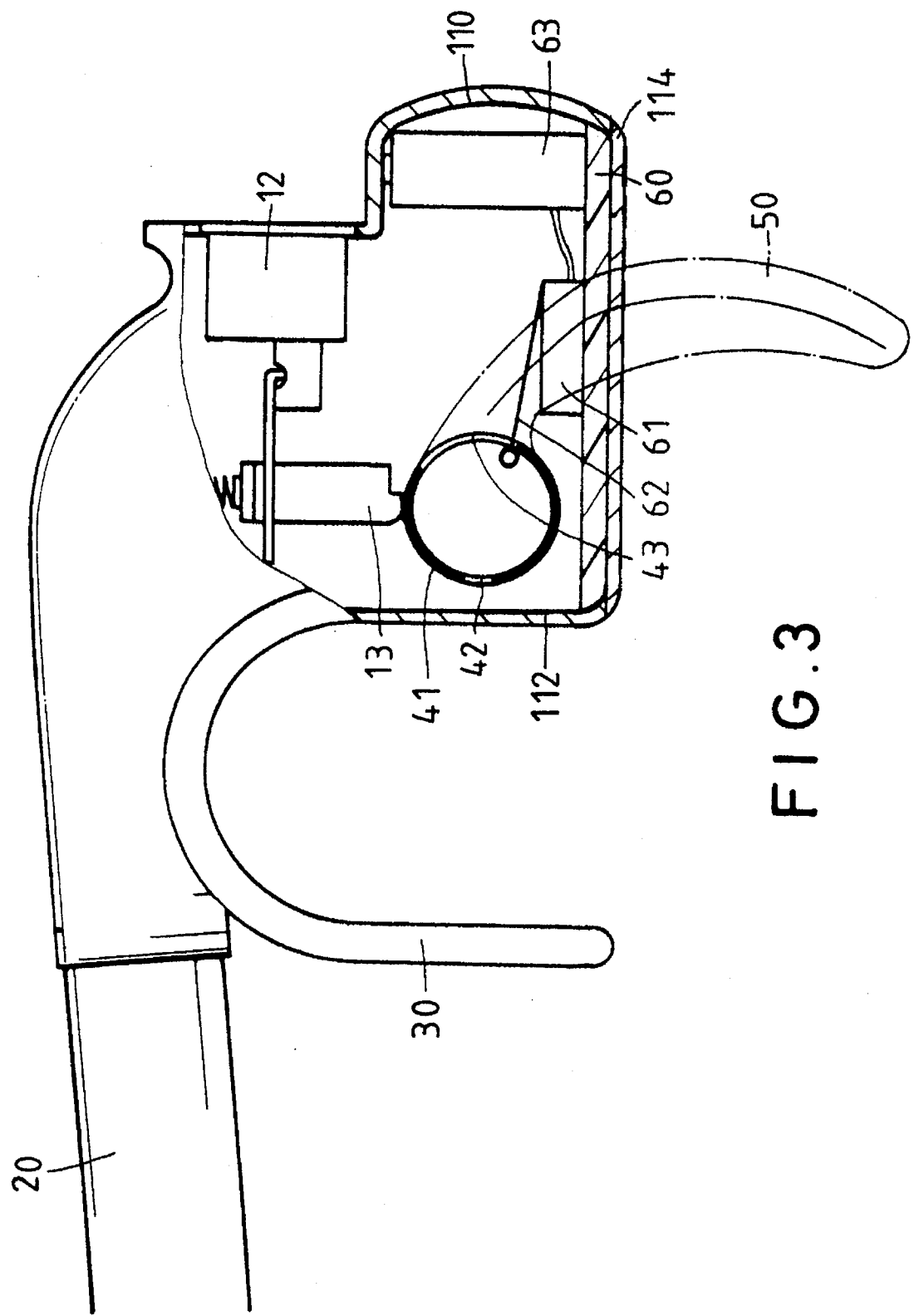
FIG. 3 is a side elevational view, partly in section, of the locking device wherein the covered-up portion of the device is in an unlocked position.

Referring to the drawings and initially to FIGS. 1 through 3, an automobile steering wheel locking device in accordance with the present invention generally includes a bar element 20 having a first end and a second end, a locking portion 10 connected to the first end of the bar element 20. The locking portion 10 includes a base 11 disposed to an under side of the first end of the bar element 20, the base 11 having a front surface 110, two side surfaces 111, a rear surface 112, a top surface 113 and a bottom 114. A tube 41 is rotatably and transversely disposed through the two side surfaces 111 of the base and has an end section 40 extending from each one of the two side surfaces 111 respectively, each of the two end sections 40 having a covered-up portion 50 extending radially therefrom. The tube 41 has a hole 42 and an actuating portion which is a slot 43 in FIG. 2 for example, both are respectively defined in an outer peripheral surface thereof and located within the base 11.

An alarm means is disposed on the bottom 114 and has a board 60 onto which a limit switch 61 and a voice producer 63 are disposed. The limit switch 61 has an actuating rod 62 extending therefrom so as to be inserted into the slot 43 of the tube 41.

A lock 12 is disposed in the first end of the bar element 20, the lock 12 operatably connected to a pin 13 disposed in the first end of the bar element 20 so as to operate the pin 13 to be inserted into the hole 42 of the tube 41 or to be moved away from the hole 42 of the tube 41. A plate 30 extends from the bar element 20 and has a space defined between the plate 30 and the rear surface 112 of the base 11.

Figure 4:
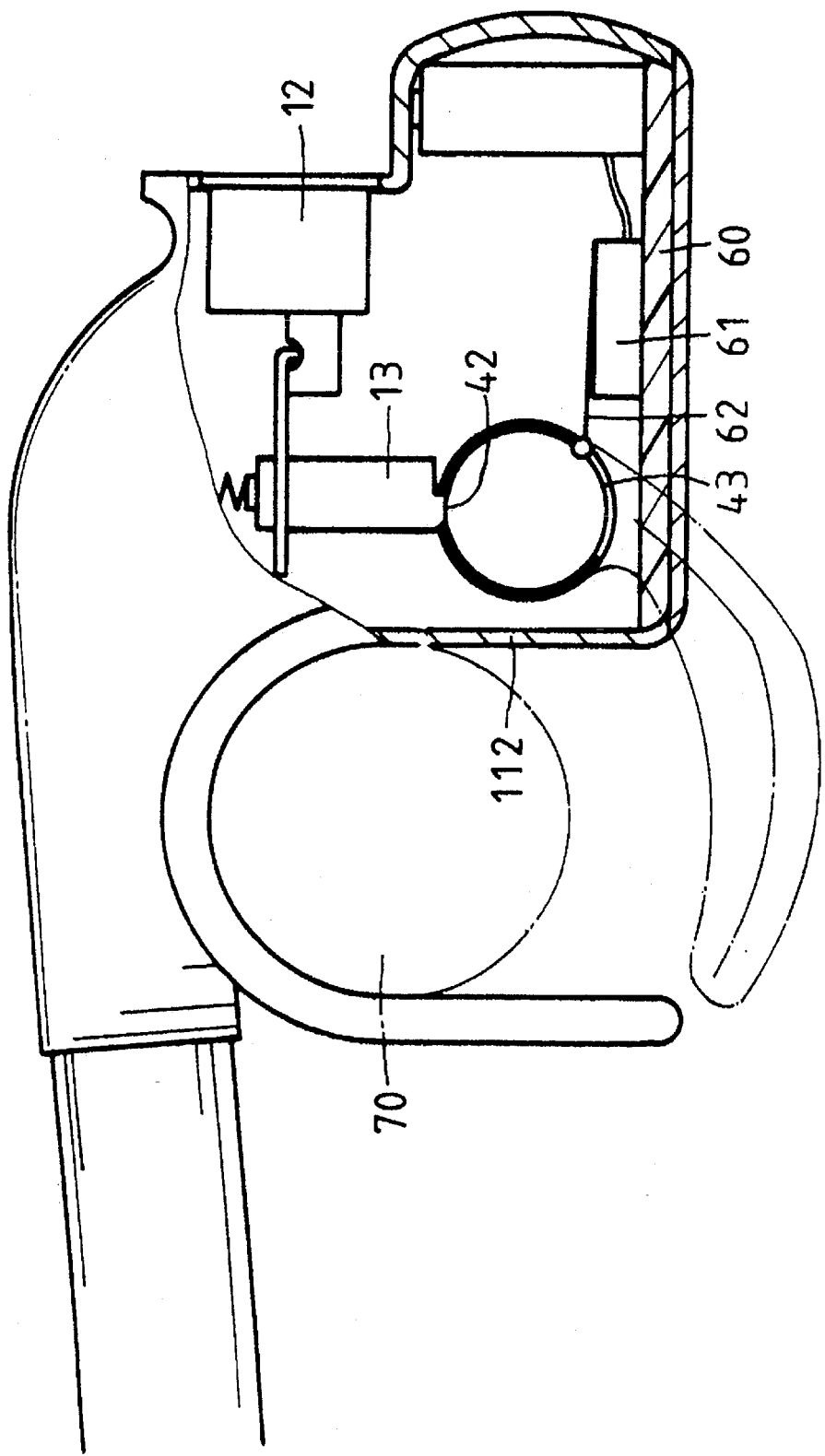
FIG. 4 is a side elevational view, partly in section, of the locking device wherein the covered-up portion of the device is in a locked position.

Referring to FIG. 4, when using the locking device, a user (not shown) rotates the covered-up portion 50 about an axis of the tube 41 to a locked position to cover up the space between the rear surface 112 of the base 11 and the plate 30 wherein a section of a steering wheel 70 can be received in the space, the tube 41 is rotated with the covered-up portion 50 so as to receive the pin 13 in the hole 42 by locking the lock 12. The actuating rod 62 inserted into the slot 43 is also rotated by the rotation of the tube 41 to a position to set the alarm means into an effective mode. The mode to be set of the alarm means can be released only by unlocking the lock 12 to let the pin 13 be moved away from the hole 42 of the tube 41, the tube 41 will rotate counter-clock-wise by the fact that the covered-up portions 50 drop downwardly because of the gravity.

Figure 6:
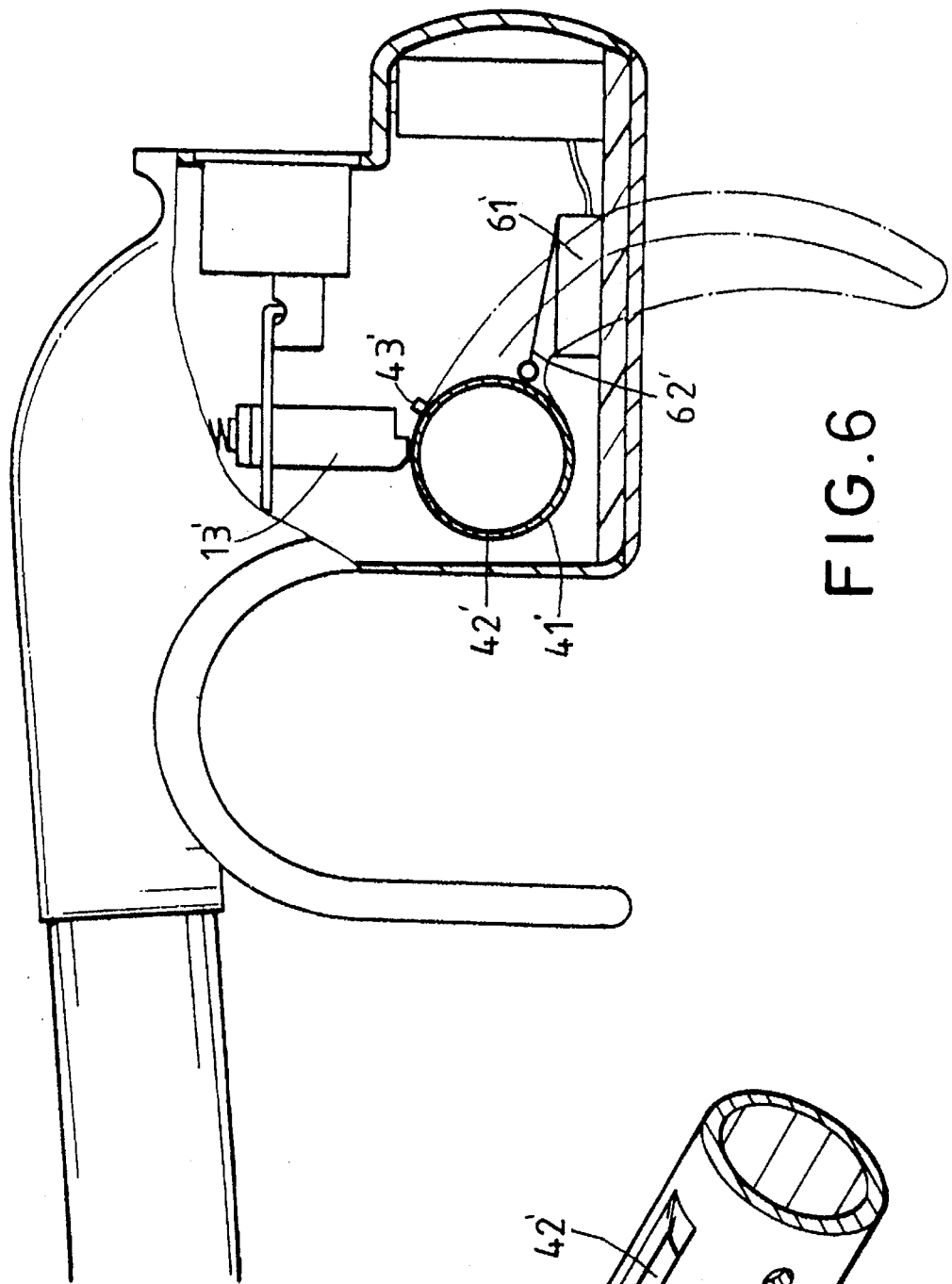
FIG. 6 is a side elevational view, partly in section, of the embodiment of the locking device wherein the covered-up portion of the device is in an unlocked position.
Figure 5:
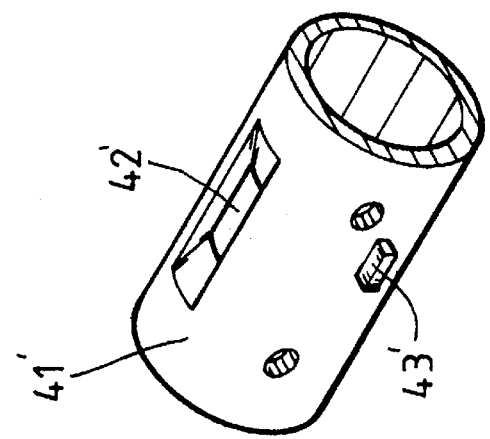
FIG. 5 is a perspective view of a section of the tube of another embodiment of the device in accordance with the present invention.
Figure 7:
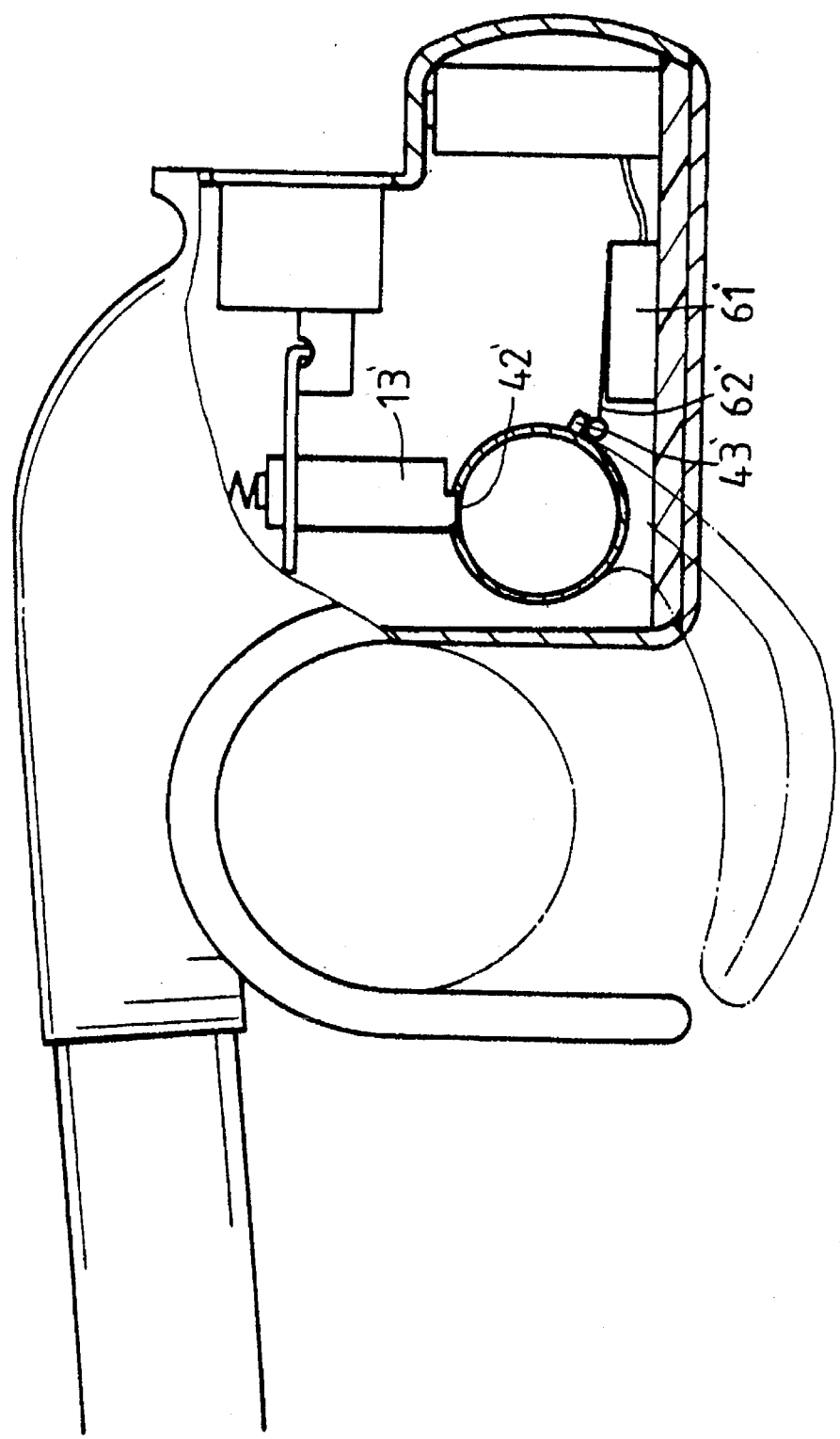
FIG. 7 is a side elevational view, partly in section, of the embodiment of the locking device wherein the covered-up portion of the device is in a locked position.

FIGS. 5 through 7 show another embodiment of the present invention wherein the tube 41' has an actuating portion which is a stud 43' extending radially from the tube 41' so as to push the actuating rod 62' of the limit switch 61' and has a hole 42' defined therein so as to receive the pin 13' therein.

Accordingly, the alarm means can be set simultaneously when the steering wheel locking device is locked, and this can produce alarm signals if the locking device is opened by informal manner.

Although the invention has been explained in relation to its preferred embodiment, it is to be understood that many other possible modifications and variations can be made without departing from the spirit and scope of the invention as hereinafter claimed.

I claim:

1. An automobile steering locking device comprising:

a bar element having a first end and a second end;

a locking portion connected to said first end of said bar element and including a base disposed to an under side of said first end of said bar element, said base having a front surface, two side surfaces, a rear surface, a top surface and a bottom, a tube rotatably and transversely disposed through said two side surfaces of said base and having an end section extending from each one of said two side surfaces respectively, each of said two end sections having a covered-up portion extending radially therefrom, said tube having a hole and an actuating portion respectively defined in an outer peripheral surface thereof and both of said hole and said actuating portion located within said base;

an alarm means disposed on said bottom and having a limit switch connected to said alarm means wherein said limit switch having an actuating rod extending therefrom so as to connect to said actuating portion of said tube;

a lock disposed in said first end of said bar element, said lock operatably connected to a pin disposed in said first end of said bar element so as to controllably operate said pin inserted into said hole of said tube, and a plate extending from said bar element and having a space defined between said plate and said rear surface of said base, said covered-up portion rotated to a position by rotating said tube to cover up said space between said rear surface of said base and said plate.

2. The automobile steering wheel locking device as claimed in claim 1 wherein said actuating portion of said tube is a slot into which said actuating rod of said limit switch is inserted.

3. The automobile steering wheel locking device as claimed in claim 1 wherein said actuating portion of said tube is a stud extending radially therefrom so as to move said actuating rod of said limit switch.

* * * * *